United States Patent
Kunz et al.

(10) Patent No.: US 11,622,266 B2
(45) Date of Patent: *Apr. 4, 2023

(54) KEY REFRESH FOR SMALL-DATA TRAFFIC

(71) Applicant: Lenovo (Singapore) PTE. LTD., New Tech Park (SG)

(72) Inventors: Andreas Kunz, Ladenburg (DE); Genadi Velev, Darmstadt (DE); Joachim Loehr, Wiesbaden (DE); Prateek Basu Mallick, Dreieich (DE); Ravi Kuchibhotla, Chicago, IL (US); Alexander Johann Maria Golitschek Edler von Elbwart, Darmstadt (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 24 days.

This patent is subject to a terminal disclaimer.

(21) Appl. No.: 17/204,879

(22) Filed: Mar. 17, 2021

(65) Prior Publication Data
US 2021/0204119 A1  Jul. 1, 2021

Related U.S. Application Data

(63) Continuation of application No. 16/746,471, filed on Jan. 17, 2020, now Pat. No. 10,986,497.
(Continued)

(51) Int. Cl.
*H04W 12/041* (2021.01)
*H04W 76/27* (2018.01)
(Continued)

(52) U.S. Cl.
CPC ......... *H04W 12/041* (2021.01); *H04L 69/327* (2013.01); *H04W 12/08* (2013.01);
(Continued)

(58) Field of Classification Search
CPC ..... H04W 76/27; H04W 76/38; H04W 24/04; H04W 76/10; H04W 8/24
See application file for complete search history.

(56) References Cited

U.S. PATENT DOCUMENTS

2007/0110236 A1  5/2007  Tada
2011/0044454 A1  2/2011  Baek et al.
(Continued)

OTHER PUBLICATIONS

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 16)", 3GPP TS 23.401 V16.1.0, Dec. 2018, pp. 1-411.
(Continued)

*Primary Examiner* — Khalid W Shaheed
(74) *Attorney, Agent, or Firm* — Kunzler Bean & Adamson (57) ABSTRACT

Apparatuses, methods, and systems are disclosed for key refresh triggering. One apparatus includes a transceiver and a processor that starts a counter corresponding to a UE having a small-data traffic pattern. In response to the transceiver receiving small-data traffic associated with the UE, the processor determines if a security key is valid based on a value of the counter. If the value of the counter indicates the security key is invalid, then the processor triggers a key refresh procedure. The processor relays the small-data traffic in response to the UE having a valid security key.

20 Claims, 7 Drawing Sheets

Related U.S. Application Data (60) Provisional application No. 62/794,476, filed on Jan. 18, 2019.

(51) Int. Cl.
*H04L 69/327* (2022.01)
*H04W 12/08* (2021.01)
*H04W 80/02* (2009.01)
*H04W 80/08* (2009.01)

(52) U.S. Cl.
CPC .......... *H04W 76/27* (2018.02); *H04W 80/02* (2013.01); *H04W 80/08* (2013.01)

(56) References Cited

U.S. PATENT DOCUMENTS

| | | |
|---|---|---|
| 2013/0083726 A1 | 4/2013 | Jain et al. |
| 2013/0114813 A1 | 5/2013 | Chai |
| 2013/0301611 A1 | 11/2013 | Baghel et al. |
| 2013/0308564 A1 | 11/2013 | Jain et al. |
| 2014/0003357 A1 | 1/2014 | Ejzak et al. |
| 2015/0043449 A1* | 2/2015 | Bangolae .......... H04W 52/0219 370/329 |
| 2015/0126154 A1 | 5/2015 | Yang |
| 2017/0202033 A1 | 7/2017 | Lee et al. |
| 2018/0152984 A1 | 5/2018 | Palanisamy et al. |
| 2019/0254096 A1 | 8/2019 | Wu |
| 2020/0170071 A1 | 5/2020 | Mildh et al. |

OTHER PUBLICATIONS

3GPP, "3rd Generation Partnership Project; Technical Specification Group Services and System Aspects; Procedures for the 5G System; Stage 2 (Release 15)", 3GPP TS 23.502 V15.4.1, Jan. 2019, pp. 1-347.

3GPP, "3rd Generation Partnership Project; Technical Specification Group Services and System Aspects; Security architecture and procedures for 5G system (Release 15)", 3GPP TS 33.501 V15.3.1, Dec. 2018, pp. 1-181.

3GPP, "3rd Generation Partnership Project; Technical Specification Group Services and System Aspects; Study on Cellular Internet of Things (IoT) support and evolution for the 5G System (Release 16)", 3GPP TR 23.724 V16.0.0, Dec. 2018, pp. 1-276.

3GPP, "3rd Generation Partnership Project; Technical Specification Group Services and System Aspects; Study on evolution of Cellular IoT security for the 5G System (Release 16)", 3GPP TR 33.861 V0.3.0, Nov. 2018, pp. 1-24.

3GPP, "3rd Generation Partnership Project; Technical Specification Group Services and System Aspects; System Architecture for the 5G System; Stage 2 (Release 15)", 3GPP TS 23.501 V15.4.0, Dec. 2018, pp. 1-236.

3GPP, "3rd Generation Partnership Project; Technical Specification Group Services and System Aspects; Study on the security aspects of the next generation system (Release 14)", 3GPP TR 33.899 V1.3.0, Aug. 2017, pp. 1-605.

* cited by examiner

KEY REFRESH FOR SMALL-DATA TRAFFIC

CROSS-REFERENCE TO RELATED APPLICATIONS

This application is a continuation of patent application Ser. No. 16/746,471 entitled "KEY REFRESH FOR SMALL-DATA TRAFFIC" filed on Jan. 17, 2020 which claims priority to U.S. Provisional Patent Application No. 62/794,476 entitled "Key Refresh Triggering for IoT Devices" and filed on Jan. 18, 2019 for Andreas Kunz, Genadi Velev, Joachim Loehr, Prateek Basu Mallick, Ravi Kuchibhotla, and Alexander Golitschek Edler von Elbwart, which application is incorporated herein by reference.

FIELD

The subject matter disclosed herein relates generally to wireless communications and more particularly relates to security key refresh triggering for small-data traffic (e.g., among IoT devices).

BACKGROUND

The following abbreviations are herewith defined, at least some of which are referred to within the following description: Third Generation Partnership Project ("3GPP"), Fifth Generation Core Network ("5CG"), Fifth Generation System ("5GS"), Absolute Radio Frequency Channel Number ("ARFCN"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFI"), Base Station ("BS"), Binary Phase Shift Keying ("BPSK"), Bandwidth Part ("BWP"), Cipher Key ("CK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Discrete Fourier Transform Spread ("DFTS"), Downlink Control Information ("DCI"), Downlink ("DL"), Downlink Pilot Time Slot ("DwPTS"), Dual Connectivity ("DC"), Dual Registration mode ("DR mode"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), E-UTRA Absolute Radio Frequency Channel Number ("EARFCN"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Integrity Key ("IK"), Internet-of-Things ("IoT"), International Mobile Subscriber Identity ("IMSI"), Key Derivation Function ("KDF"), Licensed Assisted Access ("LAA"), Load Based Equipment ("LBE"), Listen-Before-Talk ("LBT"), Long Term Evolution ("LTE"), Multiple Access ("MA"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Next Hop ("NH"), Next Hop Chaining Counter ("NCC"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), Packet Data Unit ("PDU", used in connection with 'PDU Session'), Packet Switched ("PS", e.g., Packet Switched domain or Packet Switched service), Primary Cell ("PCell"), Physical Broadcast Channel ("PBCH"), Physical Cell Identity ("PCP"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Security Mode Command ("SMC") Session Management ("SM"), Session Management Function ("SMF"), Service Provider ("SP"), Signal-to-Interference-Plus-Noise Ratio ("SINR"), Single Network Slice Selection Assistance Information ("S-NSSAI"), Single Registration mode ("SR mode"), Sounding Reference Signal ("SRS"), System Information Block ("SIB"), Synchronization Signal ("SS"), Supplementary Uplink ("SUL"), Subscriber Identification Module ("SIM"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR"), Uplink Control Information ("UCI"), User Entity/Equipment (Mobile Terminal) ("UE"), UE Configuration Update ("UCU"), UE Route Selection Policy ("URSP"), Uplink ("UL"), User Plane ("UP"), Universal Mobile Telecommunications System ("UMTS"), UMTS Subscriber Identification Module ("USIM"), UMTS Terrestrial Radio Access ("UTRA"), UMTS Terrestrial Radio Access Network ("UTRAN"), Uplink Pilot Time Slot ("UpPTS"), Ultra-reliability and Low-latency Communications ("URLLC"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In wireless communication systems, encryptions keys are used to protect data. However, next generation wireless communication systems are expected to serve wireless devices that send relatively small amounts of data and may send the small data infrequently, so that current key refresh procedures are inadequate.

BRIEF SUMMARY

Disclosed are procedures for security key refresh triggering for small-data traffic. Apparatuses and systems also perform the functions of the methods. The methods may also be embodied in one or more computer program products comprising a computer readable storage medium that stores executable code that, when executed by a processor, perform the steps of the methods.

One method of a network function device for key refresh triggering includes starting a counter corresponding to a remote unit (i.e., a UE) having a small-data traffic pattern. The method includes receiving small-data traffic associated with the remote unit and determining if a security key is valid based on a value of the counter. If the value of the counter indicates the security key is invalid, then the method includes triggering a key refresh procedure. The method includes relaying the small-data traffic in response to the remote unit having a valid security key.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for key refreshing for protection of small-data, e.g., sent by IoT devices, for both Mobile-Originated ("MO") and Mobile-Terminated ("MT") communication. The IoT devices may utilize an infrequent or frequent transmission scheme/traffic patterns. In many scenarios, such UEs are stationary so that handover procedure for these UEs does not occur often, if at all. IoT communication over a cellular network is referred to as Cellular IoT ("CIoT").

As discussed in greater detail below, small-data traffic refers to communication of relatively amounts of data, such that the data can be carried within an information element.

One example of an information element ("IE") that can be used to carry small-data traffic is the NAS PDU. The NAS PDU contains a CN-to-UE or UE-to-CN message that is transferred without interpretation in the radio network controller ("RNC"). In other embodiments, the NAS PDU may contain call control messages, session management ("SM") messages, supplementary service messages, short messaging service ("SMS") messages and mobility management ("MM") messages.

The solutions disclosed herein may be selectively applied according to communication frequency (also referred to as "traffic pattern"). For example, solutions for a UE that communicates (e.g., transmits and/or receives) small-data messages at an infrequent rate may be less applicable for a UE that communicates at a more frequency rate. Examples of infrequent small-data traffic patterns include a few messages per week, one message per day, a few messages per day, etc. Examples of frequent small-data traffic patterns include one message per hour, a few messages per hour, one or messages per minute, etc.

IoT devices, or other devices supporting infrequent small-data communication often are low complexity, power constrained and low data-rate UEs. One example of a device supporting infrequent small-data communication is a utility meter, which may not be mobile throughout its operational lifetime. It is expected that the data size per device remains small.

IoT or other devices supporting frequent small-data communication on the other hand are relatively more complex and are often full-feature (or near-full-feature) active UEs with an assumed traffic pattern ranging from a few small-data transmissions per hour to multiple small-data transmissions per minute. One example of a device supporting frequent small-data communication is a tracking device. It is expected that the data size per device remains small. Traffic characteristics for UEs using frequent small data transmissions may lead to inefficient use of resources in the wireless network (e.g., PLMN) and high UE power consumption without use of appropriate optimization.

Note that some UEs may transition between infrequent small-data communication and frequent small data communication. In various embodiments, an IoT UE may operate using an infrequent traffic pattern until certain trigger(s) causes the UE to transition to a more frequent reporting mode, thus falling under the frequent traffic pattern. For example, the tracking device may operate using an infrequent traffic pattern while stationary, but transition to a frequent traffic pattern when in motion. As another example, an environmental sensor may operate using an infrequent traffic pattern until certain conditions are detected, and then operate using a frequent traffic pattern for a set amount of time or until other conditions are detected.

Assuming that the small-data communications are protected (e.g., encryption and/or integrity protection is applied), the traffic pattern (also referred to as "transmission scheme") of the UE implies similar usage patterns of session keys whether for confidentiality or integrity protection. Here, small-data traffic UEs with a frequent traffic pattern (referred to as "frequent" UE devices) are presumed to use session keys more frequently than small-data traffic UEs with an infrequent traffic pattern (referred to as "infrequent" UE devices). Therefore, an attacker on the air-interface sniffing the traffic would have more time versus more protected data to mount a key recovery attack depending on the device transmission scheme/traffic pattern.

For the infrequent UE device, an attacker sniffing the traffic on the air-interface has more time in between transmissions to mount a key recovery attack. On the other hand, for the frequent UE device, the attacker would have access to more protected small-data to mount the same attack. Regardless of the transmission scheme/traffic pattern, if such an attack succeeds, then the attacker would be able to eavesdrop on the communication or even inject counterfeit small-data.

To mitigate the security threats described above, key refresh solutions are described both for infrequent small-data traffic and for frequent small-data traffic. The described key refresh solutions indicate when and how to refresh the security keys for small-data UEs.

Figure 1:
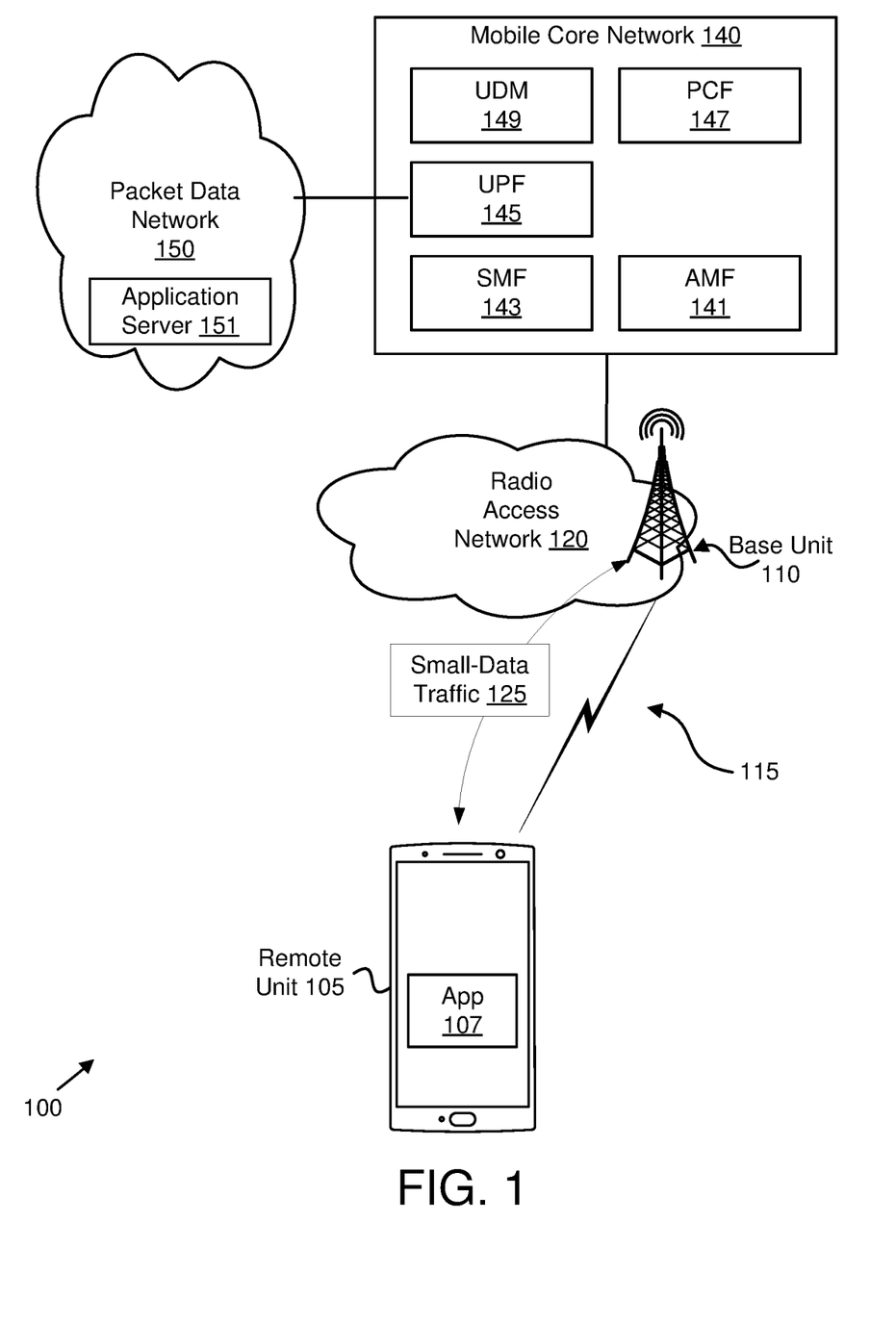
FIG. 1 is a schematic block diagram illustrating one embodiment of a wireless communication system for key refresh triggering.

FIG. 1 depicts a wireless communication system 100 for key refresh triggering for wireless devices communicating small-data traffic 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

While FIG. 1 depicts components of a 5G RAN and a 5G core network, the described embodiments for key refresh triggering for wireless devices communicating small-data traffic 125 apply to other types of communication networks, including IEEE 802.11 variants, GSM, GPRS, UMTS, LTE variants, CDMA 2000, Bluetooth, ZigBee, Sigfoxx, and the like.

Generally, the present disclosure describes systems, methods, and apparatus for key refresh triggering for remote units 105 supporting small-data communication 125, e.g., IoT devices. In the following descriptions, the operations are described mainly in the context of 5G NR and the 5G core network. However, the proposed solutions/methods are also equally applicable to other mobile communication systems supporting small-data (e.g., IoT) traffic. For example, in an LTE variant involving a EPC, the AMF 141 may be mapped to an MME, the SMF mapped to a control plane portion of a PGW and/or to an MME, the UPF map to a SGW and a user plane portion of the PGW, the UDM/UDR maps to a HSS, etc.

For small-data communication 125 according to an infrequent traffic pattern, the small-data packets may be exchanged at the NAS layer. However, the NAS keys may be used for too long so that an attacker has enough time for key recovery attacks. To mitigate this, the AMF 141 may use a key refresh counter or timer for NAS small-data packets in the AMF 141 in order to trigger NAS key refreshing. The counter or timer may be part of the UE security context (of the remote unit 105) and may be signaled from the SMF 143 to the AMF 141.

For small-data communication 125 according to a frequent traffic pattern, the small-data packets may be exchanged at the RRC layer. A counter or timer for RRC state transitions or limited PDCP packets in the base unit 110 may be used in order to trigger AS key refreshing. The counter or timer may be part of the UE security context (of the remote unit 105) and may be signaled from the SMF 143 via the AMF 141 to the base unit 110.

Figure 2:
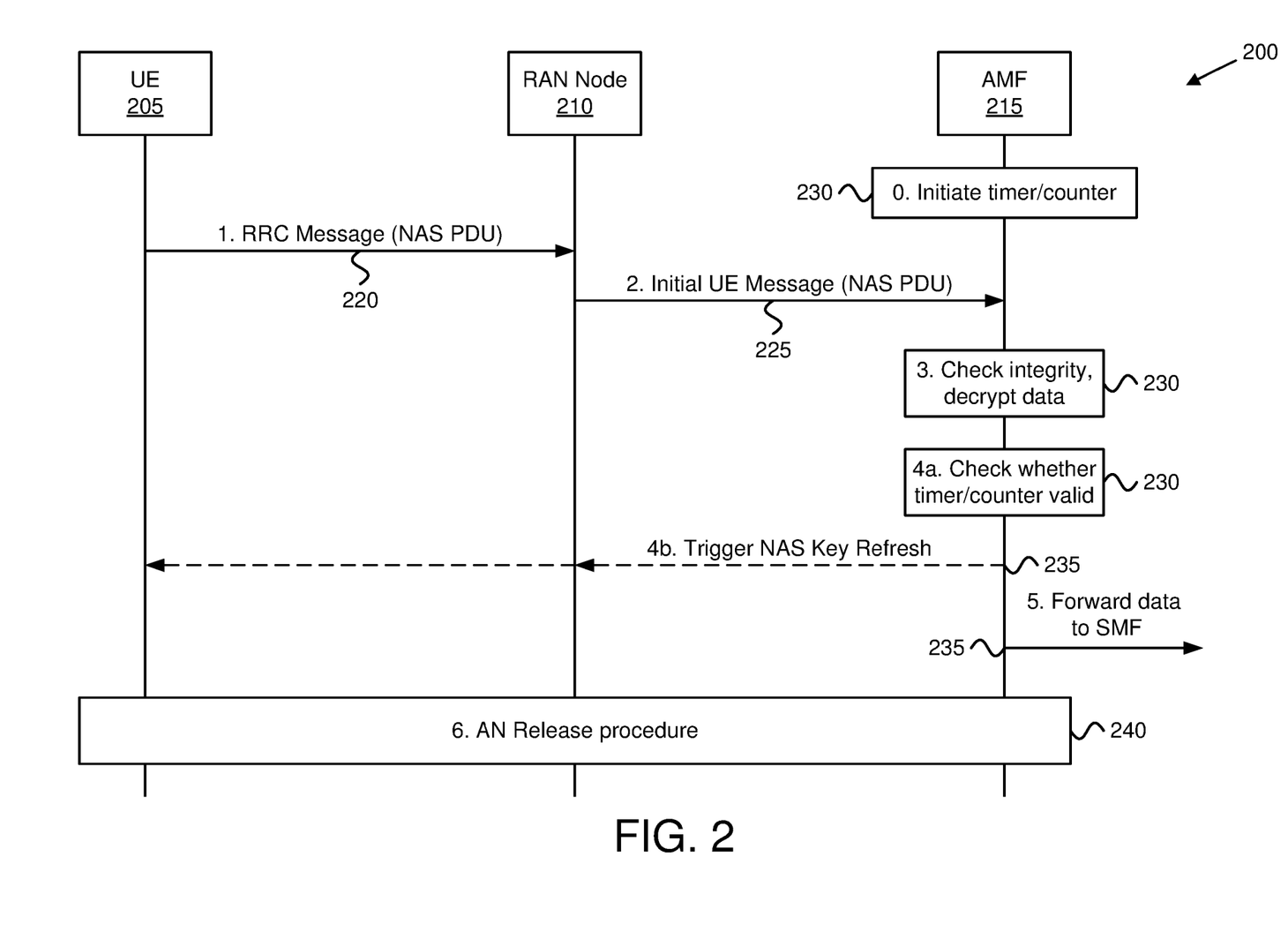
FIG. 2 is a diagram illustrating one embodiment of a call flow for mobile-originating infrequent small-data delivery via NAS messages.

FIG. 2 depicts a procedure 200 for Mobile-Originating infrequent small-data delivery via NAS messages. The procedure 200 does not consider delivery of multiple packets or bi-directional packet exchange. In general, "small-data" refers to the need to deliver a sufficiently small quantity of data that can fit in one NAS PDU message. For infrequent transmission the NAS keys may be used for too long a time so that an attacker would have enough time for key recovery attacks.

The procedure 200 involves a UE 205, a RAN node 210, and an AMF 215. The UE 205 may be one embodiment of the remote unit 105 supporting small-data communication.

The RAN node 210 may be one embodiment of the base unit 110 supporting small-data communication. The AMF 215 may be one embodiment of the AMF 141 supporting small-data communication.

To minimize the risk of key recovery attack, at step 0, the AMF 215 initiates a refresh timer/counter (e.g., starts a Key Refresh Timer and/or a NAS COUNTER for UL/DL small-data packets) (see block 220). Here, the AMF 215 may initiate the refresh timer/counter at the initial registration of the UE 205. In one embodiment, the AMF 215 initiates the timer/counter when it determines from the CN parameters (e.g., core network parameters) that the UE 205 is operating with an infrequent small-data traffic pattern. The NAS UL/DL COUNT limit/timer value may be preconfigured in the AMF 215 or part of the security policy sent to the AMF 215 (e.g., from the SMF).

At step 1, the UE 205 sends an RRC message to the RAN node 210 with a NAS PDU containing the encrypted small-data (see messaging 225). Examples of suitable RRC messages include the RRC Connection Establishment message and the RRC Early Data Request message. At step 2, the RAN node 210 forwards the NAS PDU to the AMF 215 (see messaging 230). As depicted, the NAS PDU message may be encapsulated in an Initial UE message. At step 3, the AMF 215 checks the integrity of the incoming NAS PDU and decrypts the data it contains (see block 235).

At step 4a, when the AMF 215 receives a NAS PDU from the UE 205, the AMF 215 may determine whether the timer has expired and/or the NAS UL count (tracked using NAS UL packet counter) for small-data has exceeded the limit (see block 240). At step 4b, if the timer has expired and/or the NAS UL count for small-data limit is reached, then the AMF 215 may initiate a NAS key refresh, for example using either a NAS security mode command ("SMC") procedure or a NAS key refresh procedure (see optional messaging 245). One example of a NAS SMC procedure is described in 3GPP TS 33.501, clause 6.7.2. One example of a NAS key refresh procedure is described in 3GPP TS 33.501, clause 6.9.4.3. While FIG. 2 shows the AMF 215 checking whether the timer/counter is valid and optionally triggering NAS key refresh after checking the integrity of the small-data packet, in other embodiments the AMF 215 checks whether the timer/counter is valid and triggers NAS key refresh (if needed) before checking the integrity of the small-data packet or concurrently with checking the integrity of the small-data packet.

At step 5, if the timer is not expired and/or if the NAS UL count for small-data does not exceed the limit, then the AMF 215 forwards the data, e.g., to the (V-)SMF (see messaging 250). Note that performing key refresh resets the timer and/or NAS UL count. As the small-data has now been delivered, at step 6 the UE's logical NG-AP signaling connection and RRC signaling connection are released (see block 255). One example of AN release procedure is described in 3GPP TS 23.502, clause 4.2.6.

Figure 3:
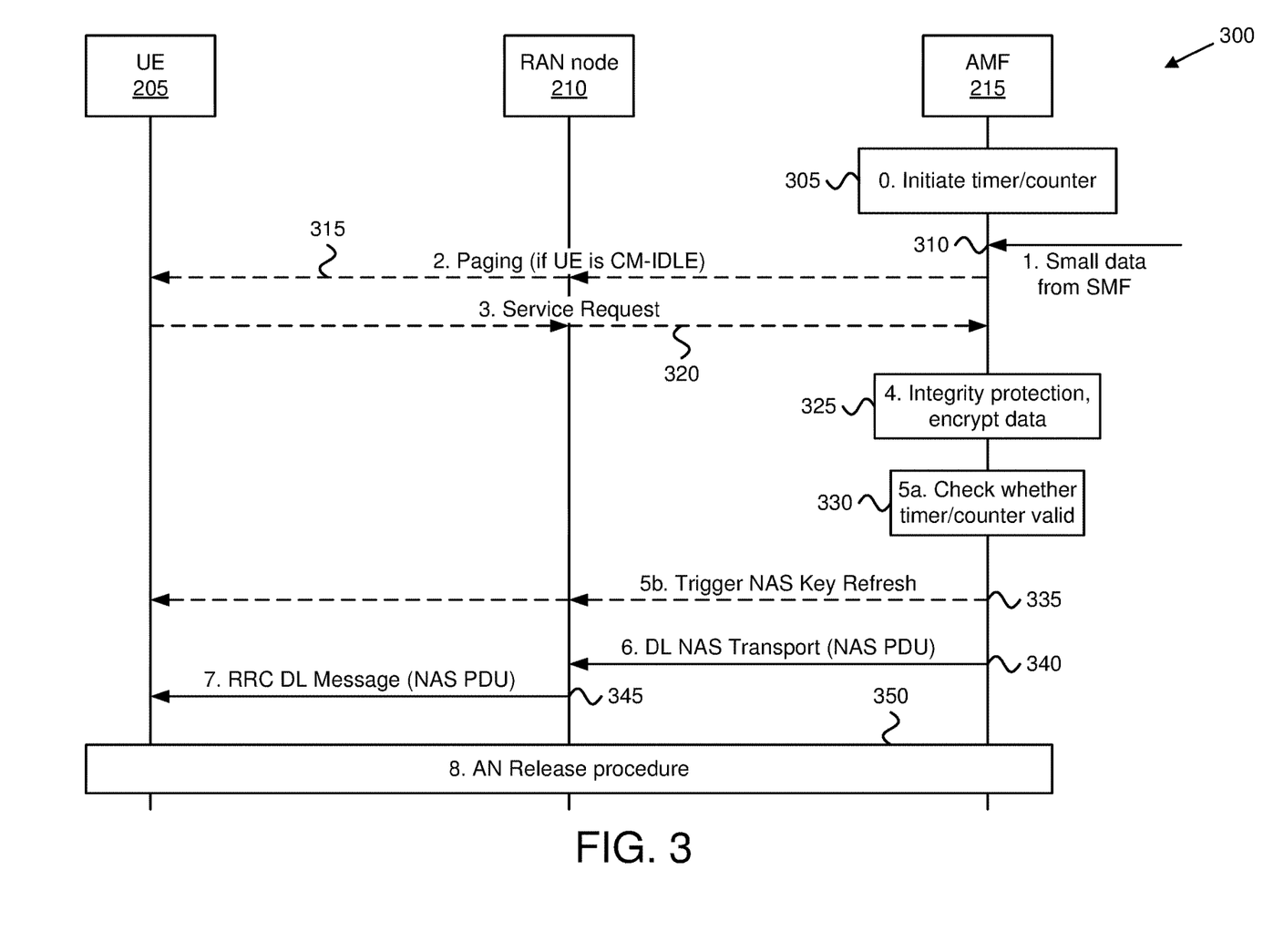
FIG. 3 is a diagram illustrating one embodiment of a call flow for mobile-terminating infrequent small-data delivery via NAS messages.

FIG. 3 depicts a procedure 300 for mobile terminating infrequent small-data delivery via NAS messages. The procedure 300 involves the UE 205, the RAN node 210, and the AMF 215. Again, "small-data" refers to the need to deliver a sufficiently small quantity of data that can fit in one NAS PDU message. For infrequent small-data transmission the NAS keys may be used for too long a time so that an attacker would have enough time for key recovery attacks.

To minimize the risk of key recovery attack, at step 0, the AMF 215 initiates a refresh timer/counter (e.g., starts a Key Refresh Timer and/or a NAS COUNTER for UL/DL small-data packets) (see block 305). Here, the AMF 215 may initiate the refresh timer/counter at the initial registration of the UE 205. In one embodiment, the AMF 215 initiates the timer/counter when it determines from the CN parameters (e.g., core network parameters) that the UE 205 is operating with an infrequent small-data traffic pattern. The NAS UL/DL COUNT limit/timer value may be preconfigured in the AMF 215 or part of the security policy sent to the AMF 215 (e.g., from the SMF).

At step 1, the AMF 215 receives a small-data packet, e.g., forwarded from a (V-)SMF (see messaging 310). At step 2, if the UE 205 is in CM Idle mode, then the AMF 215 sends a paging message to RAN node 210 and to the UE 205 (see conditional messaging 315). Note that if the UE 205 is in CM Connected mode when the small-data packet is received from the (V-)SMF, then the AMF 215 does not send the paging message. At step 3, if the UE 205 receives paging message, then it responds with a service request message (see conditional messaging 320). At step 4, the AMF 215 ciphers and integrity protects a NAS transport message with the NAS PDU containing the small-data (see block 325).

At step 5a, when the AMF 215 receives a small-data PDU from the SMF, the AMF 215 may determine whether the timer has expired and/or the NAS DL count (tracked using NAS DL counter) for small-data has exceeded the limit (see block 330). At step 5b, if the timer expired and/or the NAS DL count for small-data limit is reached, then the AMF 215 may initiate either a NAS SMC procedure or a NAS key refresh procedure (see conditional messaging 335). One example of a NAS SMC procedure is described in 3GPP TS 33.501, clause 6.7.2. One example of a NAS key refresh procedure is described in 3GPP TS 33.501, clause 6.9.4.3. Note that performing key refresh resets the Key Refresh Timer and/or the NAS COUNTER for UL/DL small-data packets. While FIG. 3 shows the AMF 215 checking whether the timer/counter is valid and optionally triggering NAS key refresh after protecting the small-data packet, in other embodiments the AMF 215 checks whether the timer/counter is valid and triggers NAS key refresh (if needed) before protecting the small-data packet (i.e., as step 2, step 4, etc.) or concurrently with protecting the small-data packet.

At step 6, the AMF 215 sends the DL NAS transport message to the RAN node 210 containing the NAS PDU with the small-data packet (see messaging 340). At step 7, the RAN node 210 delivers the NAS payload over RRC to the UE 205 (see messaging 345). As the small-data has now been delivered, at step 8 the UE's logical NG-AP signaling connection and RRC signaling connection are released (see block 350). One example of AN release procedure is described in 3GPP TS 23.502, clause 4.2.6.

Figure 4:
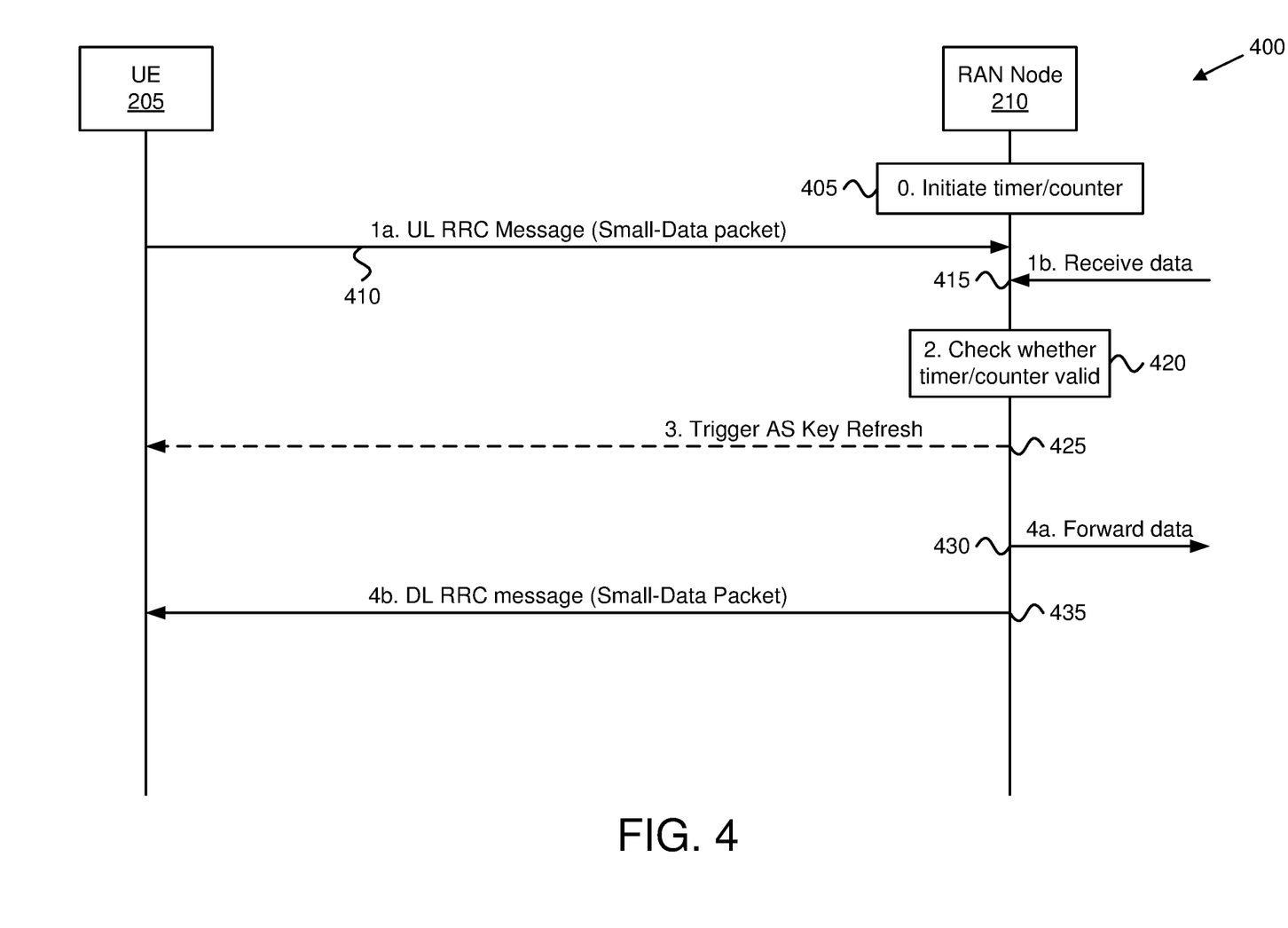
FIG. 4 is a diagram illustrating one embodiment of a call flow for handling key refresh for frequent small-data traffic.

FIG. 4 depicts a procedure 400 for handling key refresh for frequent small-data traffic, according to embodiments of the disclosure. Regarding frequent small-data communications, the above NAS-centered solutions may not apply as the UE 205 may be using the RRC-INACTIVE state or RRC-SUSPEND/RESUME in order to transmit the frequent small-data without sending any NAS message. Here, "small-data" refers to the need to deliver a sufficiently small quantity of data that can fit in one PDCP packet.

Note that the transition from RRC-INACTIVE to RRC-CONNECTED in the 5G system is similar to the RRC-RESUME to RRC-CONNECTED mode procedure in EPC. Each time when the RRC Resume procedure is performed by the UE 205 and the RRC state changes from INACTIVE/SUSPEND to CONNECTED, a new key $K_{gNB}/K_{eNB}$ is generated in the UE 205 and in the network. Input for the new vertical or horizontal key derivation is the Next Hop parameter ("NH"), the Next Hop Chaining Counter parameter ("NCC"), the physical cell ID ("PCI") and the downlink frequency (e.g., ARFCN-DL or EARFCN-DL).

However, a UE which does not perform handover procedure frequently may only use the NH and NCC values to derive new keys for the AS layer. Therefore, it is necessary that such a UE (and RAN node) refresh the $K_{gNB}/K_{eNB}$ completely so that it can start with new NH/NCC pairs.

For this reason, at step 0 the RAN node 210 starts one of the following: 1) a counter for RRC INACTIVE/SUSPEND to RRC-CONNECTED state transitions; or 2) a counter for PDCP packets transmission with reduced counter value; or 3) a timer for the duration of the activated PDU Session (see block 405). The PDCP packets are counted as long as the AS security context is available in the RAN node 210, i.e. during all Inactive and Connected states for the duration of the active user plane connection (e.g. N3 tunnel) from core network point of view.

Alternatively, at the activation of the user plane connection for a PDU session using data over NAS transmission (or EPS/5GS CIoT optimizations for control plane transmission), the RAN node starts a timer for the duration of the activated PDU Session (e.g. the time for which the AS security context is stored in the RAN node or for which the N3 tunnel(s) for the PDU session is setup).

The RAN node 210 monitors the timer/counter (see block 420). Once the counter(s) or timer started at activation of the user plane connection exceeds a pre-defined limits, the RAN node 210 may then initiate a complete new key refresh (see messaging 425), e.g. the gNB/eNB may send an <RRC Connection Setup> message on SRB0 to the UE 205 in order to proceed with RRC connection establishment as if the UE 205 was in RRC_IDLE.

While the timer/counter remains valid, the RAN node 210 may receive uplink small-data traffic from the UE (see messaging 410) and/or receive downlink small-data traffic, e.g., from the 5GC (see messaging 415). The RAN node 210 forwards uplink small-data to the 5GC (see messaging 430) and forwards downlink small-data to the UE 205 using valid security keys (see messaging 435). In some embodiments, the limits for the counter or timer may be operator-specific values configured by the network operator. In some embodiments, the core network (e.g. Session Management Function, SMF, in N2 SM Information container) may send expected PDU Session behavior (or SMF assisted RAN information for security tuning), e.g. including 'connection duration' or 'possible number of packets' or security policy for small-data transmission. The RAN node 210 then uses this information to derive the values of the counter or timer.

In case of dual connectivity, the master cell refreshes key also for secondary cell for dual connectivity in long CM-CONNECTED mode.

Figure 5:
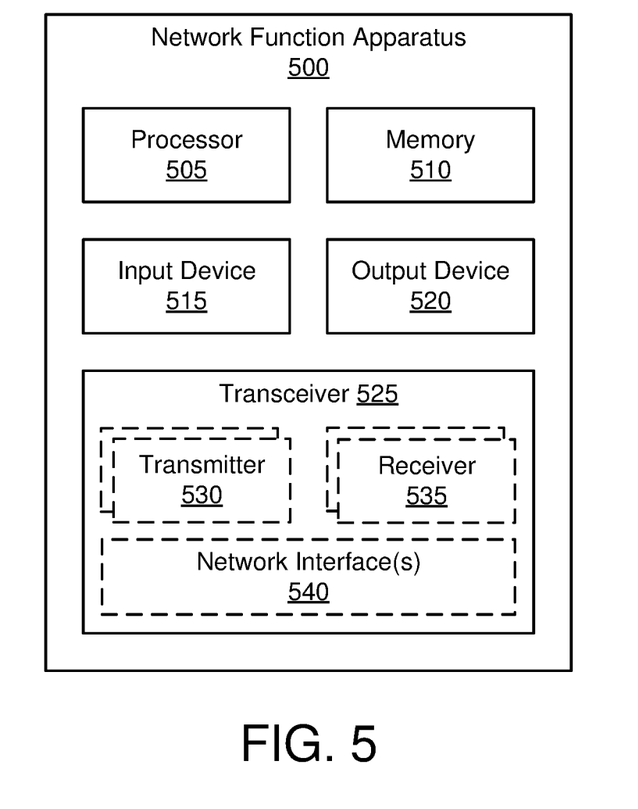
FIG. 5 is a diagram illustrating one embodiment of a network function apparatus that may be used for key refresh triggering.

FIG. 5 depicts a network function apparatus 500 that may be used for triggering key refresh, according to embodiments of the disclosure. In various embodiments, the network function apparatus 500 is used to implement one or more of the solutions described above. The network function apparatus 500 may be one embodiment of the AMF, described above. Furthermore, the network function apparatus 500 may include a processor 505, a memory 510, an input device 515, an output device 520, and a transceiver 525. In some embodiments, the input device 515 and the output device 520 are combined into a single device, such as a touchscreen. In certain embodiments, the network function apparatus 500 may not include any input device 515 and/or output device 520. In various embodiments, the network function apparatus 500 may include one or more of: the processor 505, the memory 510, and the transceiver 525, and may not include the input device 515 and/or the output device 520.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the network function apparatus 500 to implement one or more of the above described embodiments. In particular, the processor 505 may start a counter corresponding to a UE having a small-data traffic pattern. In various embodiments, the UE having a small-data traffic pattern is an IoT device. As such, the small-data traffic pattern corresponds to IoT communications over a mobile communication network (e.g., Cellular IoT traffic).

In certain embodiments, the counter tracks an amount of time elapsed since the security key was issued. In certain embodiments, the counter tracks a number of uplink packets received since the security key was issued.

In certain embodiments, the counter tracks a number of downlink packets received since the security key was issued. In certain embodiments, the counter tracks a number of PDCP packets received since the security key was issued. In certain embodiments, the counter tracks a number of RRC connection state transitions since the security key was issued.

In certain embodiments, the counter tracks an amount of time elapsed since the PDU session was activated. In certain embodiments, the counter tracks a number of NAS packets (e.g., NAS PDUs) received since the security key was issued.

The processor 505 may determine whether a security key of the UE is valid based on the counter value and trigger a key refresh procedure if the counter indicates the security key is invalid. In some embodiments, the processor 505 determines whether the security key is valid in response to receiving small-data traffic (e.g., UL and/or DL) for the UE. In certain embodiments, the security key is a NAS key. As such, triggering the key refresh procedure may include initiating a NAS SMC procedure and/or initiating a NAS key refresh procedure. In certain embodiments, the security key is a $K_{gNB}/K_{eNB}$ protecting an air-interface between the UE and a base unit (e.g., gNB or other RAN node).

Via the transceiver 525, the processor 505 may receive small-data traffic associated with the UE and may The processor 505 may further control the transceiver 525 to relay the small-data traffic in response to the UE having a valid security key.

In some embodiments, receiving the small-data traffic includes receiving a NAS message from the UE. Here, the NAS message contains the small-data traffic. One example of a NAS message carrying small-data traffic is the NAS PDU described above with reference to FIGS. 2-3. In such embodiments, relaying the small-data traffic may include the processor 505 validating the integrity of the NAS message, decrypting data in the NAS message, and forwarding (via transceiver 525) the decrypted data to a session management function.

In some embodiments, receiving the small-data traffic includes receiving the small-data traffic from a SMF. In such embodiments, relaying the small-data traffic may include the processor 505 generating a DL NAS message and encrypting and applying integrity protection to the NAS message. Via the transceiver 525, the processor may forward the encrypted data to the UE.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to key refresh triggering for IoT devices. For example, the memory 510 may store an encryption key, a refresh counter, and the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the network function apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to send messages to the UE, as described herein. Similarly, one or more receivers 535 may be used to receive messages from the UE, as described herein. Additionally, the transceiver 525 may support at least one network interface 540. Where the network function apparatus 600 acts as a RAN node, the at least one network interface 640 may facilitate communication with a UE, for example using the "Uu" interface. Where the network function apparatus 600 acts as an AMF, the at least one network interface 640 may facilitate communication with a RAN node. Although only one transmitter 530 and one receiver 535 are illustrated, the network function apparatus 500 may have any suitable number of transmitters 530 and receivers 535. Further, the transmitter(s) 525 and the receiver(s) 530 may be any suitable type of transmitters and receivers.

Figure 6:
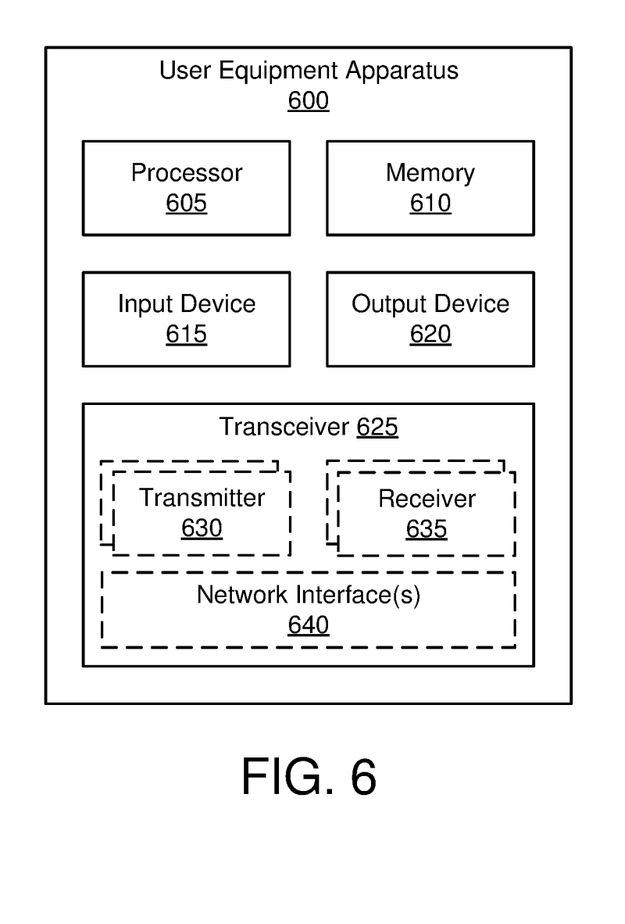
FIG. 6 is a diagram illustrating one embodiment of a user equipment apparatus that may be used for key refresh triggering.

FIG. 6 depicts a user equipment apparatus 600 that may be used for triggering key refresh, according to embodiments of the disclosure. In various embodiments, the user equipment apparatus 600 is used to implement one or more of the solutions described above. The user equipment apparatus 600 may be one embodiment of the remote unit 105, described above. Furthermore, the user equipment apparatus 600 may include a processor 605, a memory 610, an input device 615, an output device 620, and a transceiver 625. In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement one or more of the above described embodiments. In particular, the processor 605 may control the transceiver 625 to send UL small-data traffic to a core network function via a RAN node. The processor 605 may protect the small-data traffic using a security key (e.g., encryption key) and may refresh the key as described herein. In various embodiments, the security key is used to protect the air-interface between the user equipment apparatus 600 and the RAN node.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to power headroom reporting. For example, the memory 610 may store small-data traffic, security keys, and the like. In certain embodiments, the memory 610 also stores program code and related data, such as an operating system or other controller algorithms operating on the remote unit 105.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. Additionally, the transceiver 625 may support at least one network interface 640. Here, the at least one network interface 640 facilitates communication with a RAN node, such as an eNB or gNB, for example using the "Uu" interface. Additionally, the at least one network interface 640 may include an interface used for communications with one or more network functions in the mobile core network, such as a UPF, an AMF, and/or a SMF.

In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum. In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an application-specific integrated circuit ("ASIC"), or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
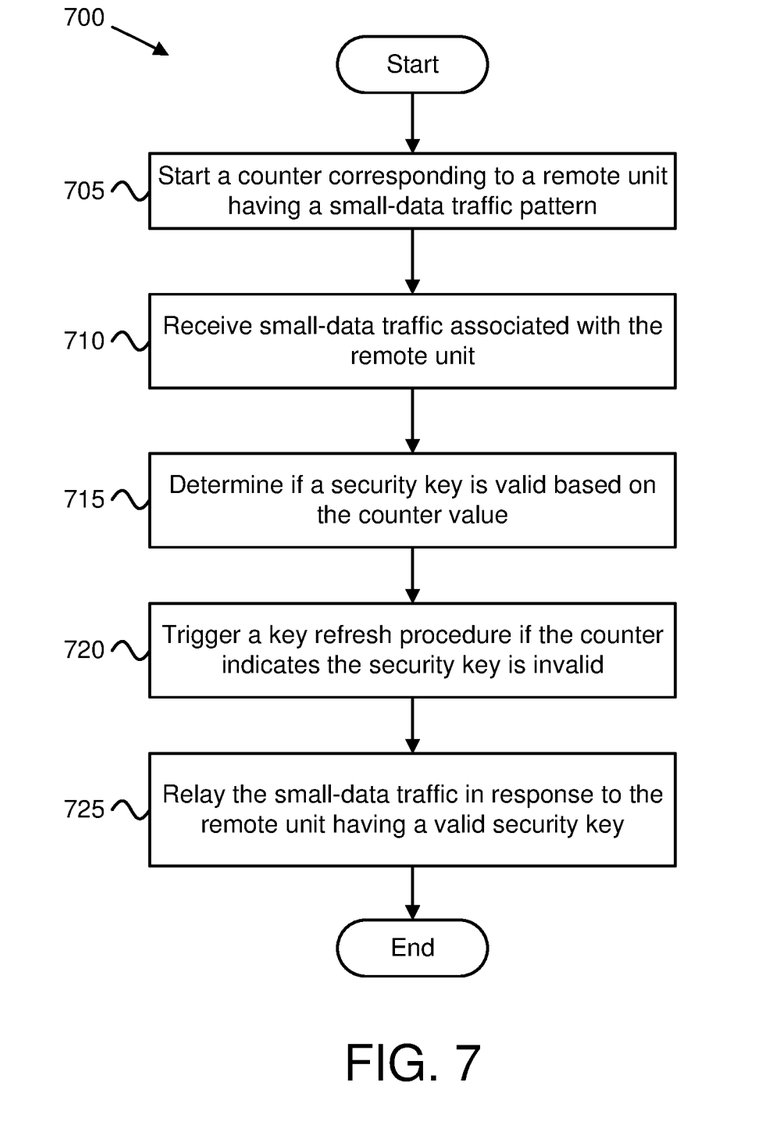
FIG. 7 is a flowchart diagram illustrating one embodiment of a method that may be used for key refresh triggering.

FIG. 7 depicts one embodiment of a method 700 for key refresh triggering, according to embodiments of the disclosure. In various embodiments, the method 700 is performed by the base unit 105, the AMF 141, the RAN node 210, the AMF 215, and/or the network function apparatus 500, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins and starts 705 a counter corresponding to a remote unit (i.e., a UE) having a small-data traffic pattern. The method 700 includes receiving 710 small-data traffic associated with the remote unit. The method 700 includes determining 715 whether a security key is valid based on a value of the counter. The method 700 includes triggering 720 a key refresh procedure if the value of the counter indicates the security key is invalid. The method 700 includes relaying 725 the small-data traffic in response to the remote unit having a valid security key. The method 700 ends.

Disclosed herein is a first apparatus for key refresh triggering, according to embodiments of the disclosure. The first apparatus may be implemented by a network function in a mobile communications network, such as the base unit 110, the AMF 141, the RAN node 210, the AMF 215, and/or the network function apparatus 500. The first apparatus includes a transceiver and a processor that starts a counter corresponding to a remote unit (i.e., a UE) having a small-data traffic pattern. In response to the transceiver receiving small-data traffic associated with the remote unit, the processor determines if a security key is valid based on a value of the counter. If the value of the counter indicates the security key is invalid, then the processor triggers a key refresh procedure. The processor relays the small-data traffic in response to the remote unit having a valid security key.

In certain embodiments, receiving the small-data traffic comprises receiving a NAS message from the remote unit, wherein the NAS message contains the small-data traffic. In certain embodiments, receiving the small-data traffic includes receiving the small-data traffic from a session management function.

In some embodiments, the security key is a NAS-layer key, wherein triggering the key refresh procedure includes one of: initiating a NAS SMC procedure and initiating a NAS key refresh procedure. In various embodiments, the security key protects an air-interface between the remote unit and a base unit (i.e., a RAN node).

In certain embodiments, the counter tracks an amount of time elapsed since the security key was issued. In certain embodiments, the counter tracks a number of uplink packets received since the security key was issued. In certain embodiments, the counter tracks a number of downlink packets received since the security key was issued.

In certain embodiments, the counter tracks a number of PDCP packets received since the security key was issued. In certain embodiments, the counter tracks a number of NAS packets (e.g., NAS PDUs) received since the security key was issued.

In certain embodiments, the counter tracks a number of RRC connection state transitions since the security key was issued. In certain embodiments, the counter tracks an amount of time elapsed since a PDU session was activated, wherein the small-data traffic is transferred over the PDU session.

Disclosed herein is a first method for key refresh triggering, according to embodiments of the disclosure. The first method may be performed by a network function in a mobile communications network, such as the base unit 110, the AMF 141, the RAN node 210, the AMF 215, and/or the network function apparatus 500. The first method includes starting a counter corresponding to a remote unit (i.e., a UE) having a small-data traffic pattern. The first method includes receiving small-data traffic associated with the remote unit and determining if a security key is valid based on a value of the counter. If the value of the counter indicates the security key is invalid, then the first method includes triggering a key refresh procedure. The first method includes relaying the small-data traffic in response to the remote unit having a valid security key.

In certain embodiments, receiving the small-data traffic comprises receiving a NAS message from the remote unit, wherein the NAS message contains the small-data traffic. In certain embodiments, receiving the small-data traffic includes receiving the small-data traffic from a session management function.

In some embodiments, the security key is a NAS-layer key, wherein triggering the key refresh procedure includes one of: initiating a NAS SMC procedure and initiating a NAS key refresh procedure. In various embodiments, the security key protects an air-interface between the remote unit and a base unit (i.e., a RAN node).

In certain embodiments, the counter tracks an amount of time elapsed since the security key was issued. In certain embodiments, the counter tracks a number of uplink packets received since the security key was issued. In certain embodiments, the counter tracks a number of downlink packets received since the security key was issued.

In certain embodiments, the counter tracks a number of PDCP packets received since the security key was issued. In certain embodiments, the counter tracks a number of NAS packets (e.g., NAS PDUs) received since the security key was issued.

In certain embodiments, the counter tracks a number of RRC connection state transitions since the security key was issued. In certain embodiments, the counter tracks an amount of time elapsed since a PDU session was activated, wherein the small-data traffic is transferred over the PDU session.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a network function comprising:
   identifying a pattern of small-data traffic of a remote unit, where the small-data traffic is protected using a security key;
   starting a counter corresponding to the remote unit, wherein the counter is for the identified small-data traffic pattern, wherein the counter tracks a number of radio resource control ("RRC") connection state transitions of the remote unit since the security key was issued, wherein the small-data traffic is transferred over a user plane connection;
   receiving small-data traffic associated with the remote unit;
   determining if a security key is valid when the value of the counter does not exceed a predefined limit;
   triggering a key refresh procedure if the value of the counter indicates that the security key is invalid; and
   relaying the small-data traffic in response to the remote unit having a valid security key.

2. The method of claim 1, wherein receiving the small-data traffic comprises receiving an RRC message from the remote unit, wherein the RRC message contains the small-data traffic.

3. The method of claim 1, wherein receiving the small-data traffic comprises receiving the small-data traffic from a session management function.

4. The method of claim 1, wherein the security key protects an air-interface between the remote unit and a base unit.

5. The method of claim 1, wherein the security key is an access stratum ("AS") key, wherein triggering the key refresh procedure comprises initiating an AS key refresh procedure or performing RRC connection establishment.

6. The method of claim 1, wherein the security key is a non-access stratum ("NAS") key, wherein triggering the key refresh procedure comprises initiating a NAS security mode command ("SMC") procedure or initiating a NAS key refresh procedure.

7. The method of claim 1, wherein the counter tracks a number of RRC-INACTIVE to RRC-CONNECTED state transitions since the security key was issued.

8. The method of claim 1, wherein the counter tracks a number of RRC-SUSPEND to RRC-CONNECTED state transitions since the security key was issued.

9. The method of claim 1, wherein the user plane connection comprises a Protocol Data Unit ("PDU") session was activated, wherein the small-data traffic is transferred over the PDU session.

10. The method of claim 9, further comprising starting a timer when the PDU session is activated and triggering a key refresh procedure when timer expires.

11. An apparatus comprising:
    a transceiver; and
    a processor that:
    identifies a pattern of small-data traffic of a remote unit, wherein the small-data traffic is protected using a security key;
    starts a counter corresponding to a remote unit, wherein the counter tracks a number of radio resource control ("RRC") connection state transitions of the remote unit since the security key was issued, wherein the small-data traffic is transferred over a user plane connection;
    determines that a security key is valid based on a value of the counter not exceeding a predefined limit, in response to the transceiver receiving small-data traffic associated with the remote unit;
    triggers a key refresh procedure if the value of the counter indicates the security key is invalid; and
    relays the small-data traffic in response to the remote unit having a valid security key.

12. The apparatus of claim 11, wherein receiving the small-data traffic comprises receiving an RRC message from the remote unit, wherein the RRC message contains the small-data traffic.

13. The apparatus of claim 11, wherein receiving the small-data traffic comprises receiving the small-data traffic from a session management function.

14. The apparatus of claim 11, wherein the security key protects an air-interface between the remote unit and a base unit.

15. The apparatus of claim 11, wherein the security key is an access stratum ("AS") key, wherein triggering the key refresh procedure comprises initiating an AS key refresh procedure or performing RRC connection establishment.

16. The apparatus of claim 11, wherein the security key is a non-access stratum ("NAS") key, wherein triggering the key refresh procedure comprises initiating a NAS security mode command ("SMC") procedure or initiating a NAS key refresh procedure.

17. The apparatus of claim 11, wherein the counter tracks a number of RRC-INACTIVE to RRC-CONNECTED state transitions since the security key was issued.

18. The apparatus of claim 11, wherein the counter tracks a number of RRC-SUSPEND to RRC-CONNECTED state transitions since the security key was issued.

19. The apparatus of claim 11, wherein the user plane connection comprises a Protocol Data Unit ("PDU") session was activated, wherein the small-data traffic is transferred over the PDU session.

20. The apparatus of claim 19, wherein the processor starts a timer when the PDU session is activated and triggering a key refresh procedure when timer expires.

* * * * *